Oct. 12, 1965 P. B. KING, JR 3,212,024
MEASURING AND TESTING CIRCUIT FOR FREQUENCY SYNTHESIZER
Filed Jan. 13, 1961
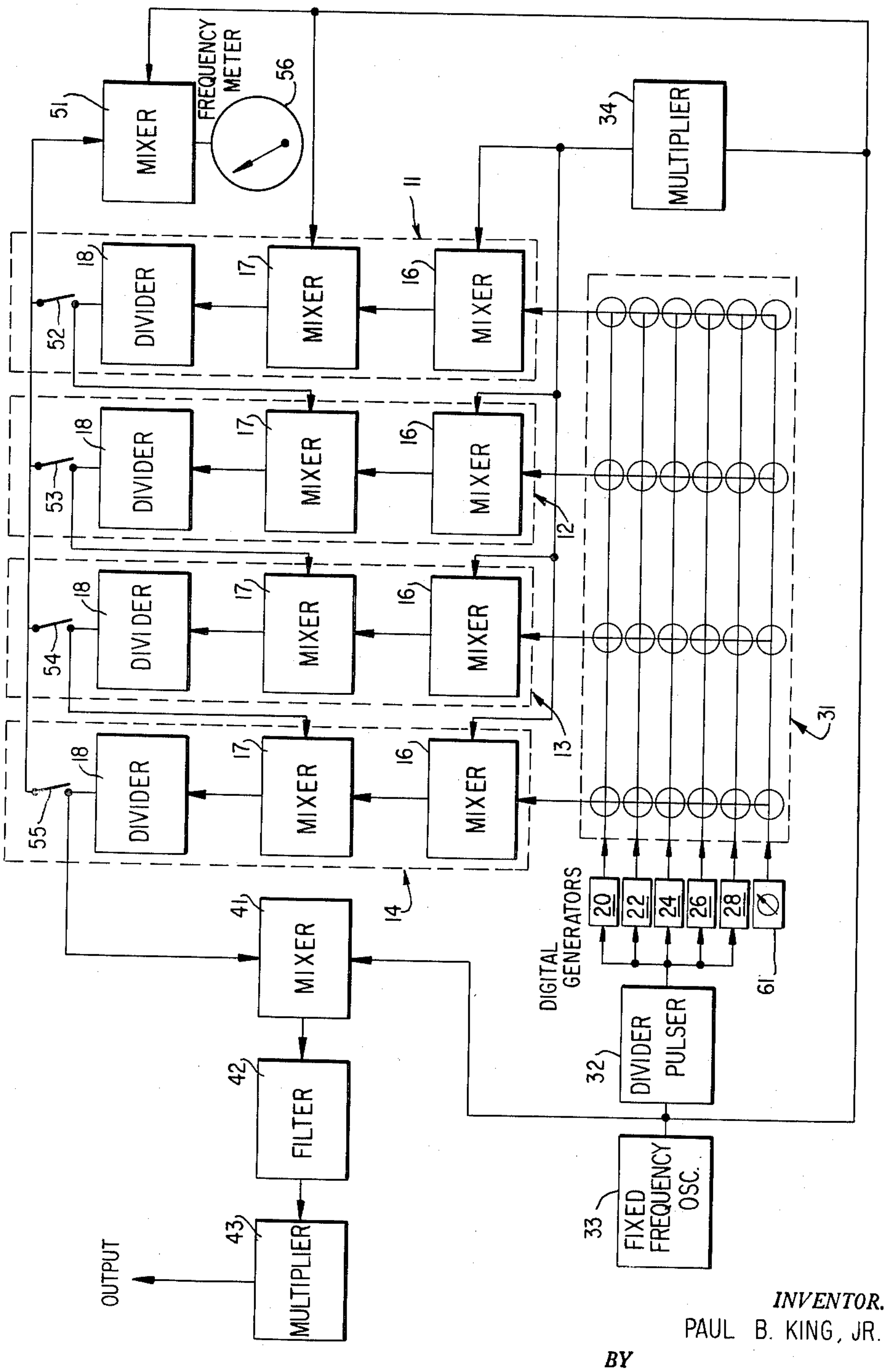
INVENTOR.
PAUL B. KING, JR.
BY
Mead, Browne, Schuyler & Beveridge
ATTORNEYS United States Patent Office 3,212,024
Patented Oct. 12, 1965

3,212,024
MEASURING AND TESTING CIRCUIT FOR FREQUENCY SYNTHESIZER

Paul B. King, Jr., Mountain Lakes, N.J., assignor to Aircraft Radio Corporation, Boonton, N.J., a corporation of New Jersey Filed Jan. 13, 1961, Ser. No. 82,601
2 Claims. (Cl. 331—44)

This invention relates to a testing and checking circuit for a frequency synthesizer to provide an indication of the proper operation of the circuits.

A particular application of the invention is found in a frequency synthesizer where a plurality of stages of mixing and dividing circuits may be selectively actuated by any one of a range of frequencies and modified by combining the output of one stage with a succeeding stage to produce at the output of the succeeding stage a frequency dependent upon the input frequencies of preceding stages.

A major object of the present invention is to provide for the measurement of the output frequency of the individual stages of mixing and dividing circuits as determined by the selected frequencies supplied to the stages.

In the attainment of these objects, a mixer circuit may be selectively coupled to the output of any one of the stages of the synthesizer. Another input of the mixer circuit is connected to a fixed frequency source which may be the same as that which controls the digital generators. The output of this mixer includes a frequency within a relatively low range which may be read on a conventional pulse integrating type frequency meter and is an indication of the frequency supplied to the stage as modified by the stage of the synthesizer.

A frequency synthesizer embodying the invention in its preferred form is shown schematically in the accompanying drawing.

The frequency synthesizer shown in the drawing includes four stages 11, 12, 13 and 14 enclosed within broken lines, each of which includes a first mixer 16, a second mixer 17 and a divider 18. While they are not individually illustrated, filters are included in the output of each circuit to attenuate undesired components in the output.

A series of digital generators 20, 22, 24, 26 and 28 produce output frequencies in digital steps which are supplied through a matrix keyboard 31 to any one of the stages 11, 12, 13 or 14 of the synthesizer. To control the frequencies of the digital generators 20, 22, 24, 26 and 28, each is coupled through a divider and pulsing circuit 32 to a fixed frequency oscillator 33. The output of fixed frequency oscillator 33 is also supplied, for a purpose to be described, through a multiplier 34 to one input of each of the first mixers in the stages of the synthesizer.

An understanding of the synthesizer may be facilitated by a specific example of frequencies utilized.

Fixed frequency oscillator 33 may produce an output of 1,000 kilocycles which is modified by the dividing and pulsing circuit 32 to trigger the digital generators so they produce outputs in digital steps. For example, generator 20 has an output frequency the same as the fixed frequency oscillator 33 namely 1,000 kilocycles; generator 22 has an output of 1,020 kilocycles; generator 24 has an output of 1,040 kilocycles; generator 26 has an output of 1,060 kilocycles; and generator 28 has an output of 1,080 kilocycles. These are supplied to the matrix keyboard 31 so the output of any one of the digital generators may be connected to the input of any one or more of the stages of the synthesizer. As a specific example, the output of fixed frequency oscillator 33 is modified by multiplier 34 to produce an output of 8,000 kilocycles which is supplied to one input of the initial mixer in each of the stages of the synthesizer. Assuming mixed 16 of first stage 11 is connected by the keyboard to the output of digital generator 22, the frequency of 1,020 kilocycles is mixed with 8,000 kilocycles to produce an output of 9,020 kilocycles. Second mixer 17 of the first stage 11 is connected to the output of the first mixer 16 and also to the fixed frequency source 33 to add another 1,000 kilocycles so the output of second mixer 17 is 10,020 kilocycles; this is divided by ten in divider 18 to produce an output of 1,002 kilocycles which is supplied to second mixer 17 of second stage 12. Assuming the first mixer 16 of second stage 12 is coupled to digital generator 24, 1,040 kilocycles is supplied to that mixer where it is added to the 8,000 kilocycles output of multiplier 34 to produce an output of 9,040 kilocycles which is added in second mixer 17 to the output of divider 18 of the first stage 11. This produces an output of 10,042 kilocycles which is divided in divider 18 of stage 12 to produce an output of 1,004.2 kilocycles, supplied to second mixer 17 of the third stage 13. As digital generator 26 is coupled to fist mixer 16 of third stage 13, the output of that mixer is 9,060 kilocycles which is mixed with the output from the second stage to produce an output of 10,064.2 kilocycles; this is divided in divider 18 of third stage 13 to produce an output of 1,006.42 kilocycles. Assuming the final stage 14 is supplied from digital generator 28, the output of first mixer 16, 9,080 kilocycles, is combined with the output of the third stage 13 to produce an output of 10,086.42 kilocycles. This is divided in divider 18 of fourth stage 14 to produce an output of 1,008.642 kilocycles. This output may be mixed in a mixer circuit 41 to produce one frequency corresponding to the difference of the two inputs which will be 8,642 cycles. This may be filtered at 42 and multiplied by any factor in multiplier 43 to produce an output frequency in which the individual digits are determined by operation of keyboard 31.

Operation of the frequency synthesizer is, of course, dependent upon the performance of each of these digital generators and the individual stages of the synthesizer. This invention provides a means of measuring the performance of the individual stages of the synthesizer. This is essential because any malfunction in the first stages will be carried through the entire system. For the purpose of checking the performance of each stage, mixer circuit 51 and frequency meter 56 are included. One input of mixer 51 may be selectively connected through switches 52, 53, 54 and 55 to the outputs of the dividers 18 of the respective stages 11, 12, 13 and 14 which produce output frequencies of the same order of magnitude but differing according to the selection of digital generators. The other input of mixer 51 is connected to a source of fixed frequency which may be the source 33. Mixer 51 then produces a frequency corresponding to the difference of the two inputs which is a relatively low frequency and which may be read on a low frequency meter 56 of a conventional pulse integrating type.

In operation, first stage 11 may be checked by a closing switch 52 and selectively depressing the contacts of matrix keyboard 31 to supply each output of digital generators 20, 22, 24, 26 and 28 in succession to the input mixer 16 of stage 11. When digital generator 20 is supplied to the stage 11, the output frequency should read 0 because the input frequency is 1,000 kilocycles which is added to the output of multiplier 34 to produce a frequency of 9,000 kilocycles which is combined in mixer 17 with the output of fixed frequency oscillator 33 to produce an output of 10,000 kilocycles. This is divided by 10 in divider 18 to produce an output of the stage 11 of 1,000 kilocycles. When this output is compared with the fixed frequency oscillator the difference is 0 and the frequency meter 56 will read 0 provided the digital generator 20 and all circuits of stage 11 are properly functioning. The same process is followed by depressing successive keys of the keyboard to connect other digital generators to the input mixer 16 of the first stage 11. For a second example, assuming generator 24 is coupled to the input of stage 11, a frequency of 1,040 kilocycles will be combined in mixer 16 to produce an output of 9,040 kilocycles which is modified in mixer 17 to produce an output of 10,040 kilocycles. When this is divided in divider 18 the output is 1,004 kilocycles. Mixer 51 produces a frequency corresponding to the difference of its two inputs, so that the relatively low frequency of 4 kilocycles may be conveniently read on meter 56.

The same result is achieved in successive stages, because when digital generator 20 is connected to any stage, the output of that stage will be 1,000 kilocycles. Hence, assuming that keys are depressed to connect the stages 11 and 12 to generator 20, the output of stage 12 will be 1,000 kilocycles. If the input of stage 13 is coupled to generator 28, the output of mixer 16 of the stage 13 will be 9,080 kilocycles which when combined in the mixer 17 with the output of stage 12 will be 10,080 kilocycles. This is divided by 10 in divider 18 to produce an output of 1,008 kilocycles which may be connected by switch 54 to the mixer 51 and the beat frequency of 8 kilocycles may be read on meter 56.

In the example above, digital generator 20 was connected to stages 11 and 12 supplying mixer 17 of stage 13 with exactly 1,000 kilocycles. Instead of this connection, assume that digital generator 22 is connected to stage 11 and that digital generator 26 is connected to stage 12. In this case, mixer 17 of stage 13 will be supplied with a frequency of 1,026 kilocycles which, when combined with 8,000 kilocycles and 1,080 kilocycles from digital generator 28, will produce 10,082.6 kilocycles. This divided by 10 will be 1,008.26 kilocycles. This frequency, when connected to mixer 51 by switch 54, will produce a beat frequency of 8.26 kilocycles which may be read on the meter. It is, therefore, seen that the beat frequency produced and indicated on the meter will be the digit selected for the stage being measured plus all digits to the right.

Instead of using one of the digital generators, any one or more stages may be connected through keyboard 31 to a variable frequency oscillation 61. Commensurate with the digital generators, variable frequency oscillators may have a range from 1,000 to 1,100 kilocycles. For any setting of variable frequency oscillator 61, the frequency may be read by connecting the frequency meter circuit to the output of the stage to which variable frequency oscillator 61 is connected.

While two applications of the frequency measuring circuit have been described, others will become apparent so the foregoing description is to be construed as illustrative and not in a limiting sense.

What I claim is:

1. In a frequency synthesizer having a plurality of stages of mixing and dividing circuits, a fixed frequency source, and means energized by said fixed frequency source for supplying a selected frequency to said mixing and dividing stages to obtain synthesized digitally related frequencies, the improvement which comprises a mixer circuit, means for selectively coupling one input of said mixer circuit to the output of any one of the stages of the synthesizer, means connecting the other input of said mixer circuit to said fixed frequency source, and a frequency meter connected to the output of said mixer circuit for indicating over a relatively low range a beat frequency indication of the selected frequency energizing the selected stage of the synthesizer as modified by that stage.

2. A method of testing a frequency synthesizer having a pulrality of mixing and dividing stages arranged so that the output of each lower order mixing and dividing stage is connected to an input of a next higher order mixing and dividing stage, respectively, successively applying to the lowest order mixing and dividing stage a series of frequencies in digital steps as derived from a fixed frequency source, successively mixing the output of each mixing and divider stage from the lowest order to the highest order with the fixed frequency from said fixed frequency source to produce a resultant frequency between each successive digital step, and measuring each resultant frequency on a relatively low frequency meter.

References Cited by the Examiner

UNITED STATES PATENTS

| | | | |
|---|---|---|---|
| 1,919,803 | 7/33 | Roetken | 324—79 |
| 2,178,225 | 10/39 | Diehl et al. | 324—79 X |
| 2,436,235 | 2/48 | Sunstein | 324—79 X |
| 2,627,033 | 1/53 | Jensen et al. | 324—79 |
| 2,934,716 | 4/60 | Smith | 324—79 X |
| 2,967,931 | 1/61 | Willis | 324—79 X |

ROY LAKE, *Primary Examiner.*

SAMUEL BERNSTEIN, MAYNARD R. WILBUR, *Examiners.*